US005894917A

United States Patent [19]

Kwon

[11] Patent Number: 5,894,917

[45] Date of Patent: Apr. 20, 1999

[54] STEP COMBINING SYSTEM FOR ESCALATOR

[75] Inventor: Yi Sug Kwon, Kyungsangnam-Do, Rep. of Korea

[73] Assignee: LG Industrial Systems Co., Ltd., Seoul, Rep. of Korea

[21] Appl. No.: 08/998,548

[22] Filed: Dec. 24, 1997

[30] Foreign Application Priority Data

Dec. 31, 1996 [KR] Rep. of Korea .................. 1996-79149

[51] Int. Cl.$^{6}$ .................................................... B65G 23/12

[52] U.S. Cl. ............................................................ 198/333

[58] Field of Search .................................... 198/326, 327, 198/332, 333

[56] References Cited

U.S. PATENT DOCUMENTS

| | | | |
|---|---|---|---|
| 3,789,972 | 2/1974 | Kraft | 198/333 X |
| 5,072,821 | 12/1991 | Kruse et al. | 198/333 X |
| 5,351,800 | 10/1994 | Johnson et al. | 198/333 X |
| 5,381,881 | 1/1995 | Meyer et al. | 198/333 |

FOREIGN PATENT DOCUMENTS

| | | | |
|---|---|---|---|
| 1435524 | 11/1988 | U.S.S.R. | 198/333 |

*Primary Examiner*—James R. Bidwell

[57] ABSTRACT

A step combining system of an escalator which includes a step for transferring passengers, an attaching/detaching unit, fixedly provided under each end of the step, forming a C-shaped attaching/detaching groove thereon, and a connecting shaft having an attaching/detaching bar at each end thereof, of which a diameter is smaller than that of an entrance of the groove in order to easily be attached/ detached to/from the attaching/detaching groove.

5 Claims, 4 Drawing Sheets

STEP COMBINING SYSTEM FOR ESCALATOR

BACKGROUND OF THE INVENTION

1. Field of the Invention

The present invention relates to an escalator, and in particular to an improved step combining system for an escalator, capable of easily attaching/detaching a step to/from a connecting shaft connected to a step chain.

2. Description of Conventional Art

Generally, a conventional elevator, as shown in FIG. 1, mainly includes a step unit 20 for transferring passengers, a handrail unit 10, provided at both sides of the step unit 20, for rotatively moving along a predetermined track, and an upper mechanical unit 30 for driving the handrail unit 30 and step unit 20.

As shown in FIG. 2, the step unit 20 is provided with steps 21 for transferring passengers, a step rear roller 22 formed at both ends below one side of the step 21 as a single body, a connecting shaft 23 having first joints 23*a* provided at each end thereof as a single body, and a pair of step front rollers 25 formed at both ends of the connecting shaft 23 and connected with each step chain 24. In addition, second joints 21*a* are formed at each end under the other side of step 21 as a single body, and bolt 26 and nut 27 are provided at each end of the connecting shaft 23 to connect the second joints 21*a* with the first joints 23*a*.

As shown in FIGS. 1 and 3, the upper mechanical unit 30 includes a motor 31 providing driving force, a speed reducer 32, directly connected with the motor 31, for reducing the rotary speed of the motor 31, thus increasing torque, a driving sprocket 34 connected with a rotary shaft of the speed reducer 32, and a driving shaft 37 which a driving sprocket 34', connected with the driving sprocket 34 by a driving chain 33, is provided at one side thereof and which a driving terminal gear 35 is provided at both sides thereof.

With reference to FIG. 3, the operation of the thusly constructed conventional escalator will be described.

The driving force of the motor 31 of the mechanical unit 30 is reduced by the speed reducer 32, down to a certain speed, and is conveyed to the driving sprocket 34 connected with the speed reducer 32.

Rotary power of the driving sprocket 34 is conveyed to the driving sprocket 34' by the driving chain 33, thus causing the driving sprocket 34' to rotate the driving shaft 37.

When the driving shaft 37 rotates, a step 21, which is connected with the driving terminal gears 35 provided at each end of the driving shaft 37 by the step chain 24, rotates upward and downward along guide rails (not shown).

In the conventional escalator, a step combining system of the step unit 20 as shown in FIG. 2 is provided with the bolt 26 and nut 27, which combine the second joints 21*a* of the step 21 with the first joints 23*a* of the connecting shaft 23 connected with the step chain 24.

However, when separating the connecting shaft 23 connected with the step chain 24 from the step 21, step 21 must be moved to the upper mechanical unit 30, unfastening the bolts 26 from the step 21, moving the step 21, from which the bolt 26 is unfastened, to a side panel (a), opening the side panel (a), and taking out the step 21.

The above-described actions result from which the first joints 21*a* formed in the step 21 protrude in a forward direction of the step 21, and the protruding upper portions of the first joints 21*a* are covered by another step, whereby the bolts 26 fastening the step 21 and the connecting shaft 23 can not be readily unfastened from an exterior above the step 21.

Accordingly, in the conventional step combining system, the separating operation of the step is complicated, timeconsuming, and not effectively achieved.

SUMMARY OF THE INVENTION

Accordingly, it is an object of the present invention to provide a system for connecting steps of an escalator, that permits easy attachment/detachment of a step to/from the escalator.

To achieve the above objects, a system for connecting steps of an escalator is provided which includes a step for transferring passengers. An attaching/detaching unit is fixedly provided under each end portion of the step so that each end portion does not protrude in a forward direction of the step, and includes a C-shaped attaching/detaching groove thereon. A connecting shaft is also provided having an attaching/detaching bar at each end thereof and a diameter smaller than that of an entrance of the attaching/detaching groove in order to easily be attached/detached to/from the attaching/detaching groove.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

With reference to the accompanying drawings, an embodiment of a step combining system for an escalator according to the present invention will be described.

Figure 4:
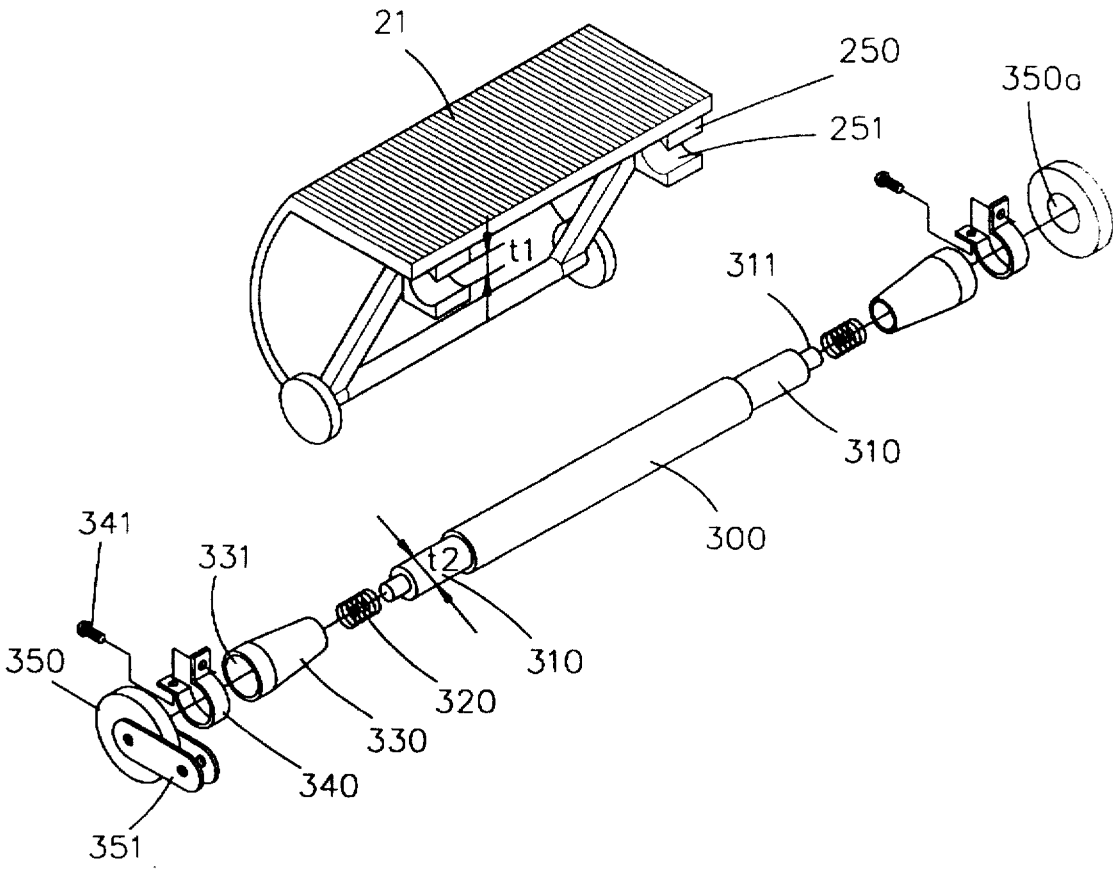
FIG. 4 is a diagram illustrating a step connected with a step chain in a step combining system for an escalator according to the present invention.

As shown in FIG. 4, the step combining system according to the present invention includes a step 21 for transferring passengers, an attaching/detaching unit 250, fixedly provided under each end portion of the step 21 so as to not protrude in a forward direction relative to the step 21. Attaching/detaching unit 250 includes a C-shaped attaching/detaching groove 251 thereon. The system also includes a connecting shaft 300 having an attaching/detaching bar 310 of a predetermined length at each end thereof, a diameter t2 of which is slightly smaller than a diameter t1 of an entrance of the groove 251 in order to easily be attached/detached to/from the groove 251.

The connecting shaft 300 includes springs 320, fitted to the attaching/detaching bars 310 provided at each end of the connecting shaft 300. Shaft 300 includes cylindrical joints 330 which each have a through hole 331 so that the bars 310 and springs 320 may pass therethrough and one tapered side. Shaft 300 further includes a fixing members 340 for fixing the joints 330 to the connecting shaft 300. In order for the springs 320 to not slip out of the respective joints 330, a supporting jaw (not shown) is formed in an inside diameter at one side of the through holes 331 of the respective joints 330.

In addition, in order to join the connecting shaft 300 with the fixing members 340 to fix the joints 330 to the attaching/detaching bars 310, end units 311, each having a diameter smaller than the diameter t2 of the bars 310, is formed at an end of each bar 310.

Step chain links 351 are connected with the connecting shaft 300 at the joints 330 by the fixing members 340, and each end of the connecting shaft 300, respectively, is inserted into inserting holes 350*a* of a pair of step front rollers 350.

Now, the operation for attaching/detaching the connecting shaft 300 to/from the step 21 according to the present invention will be described.

To connect the connecting shaft 300 to the step 21, first, the attaching/detaching bars 310 provided at each end of the connecting shaft 300 is inserted to the attaching/detaching groove 251 of the attaching/detaching unit 250 formed under the step 21 as shown in FIG. 4.

Next, the springs 320 are fitted to each attaching/detaching bars 310, and the bar 310 and springs 320 are passed through the through holes 331 of the joints 330.

Figure 5:
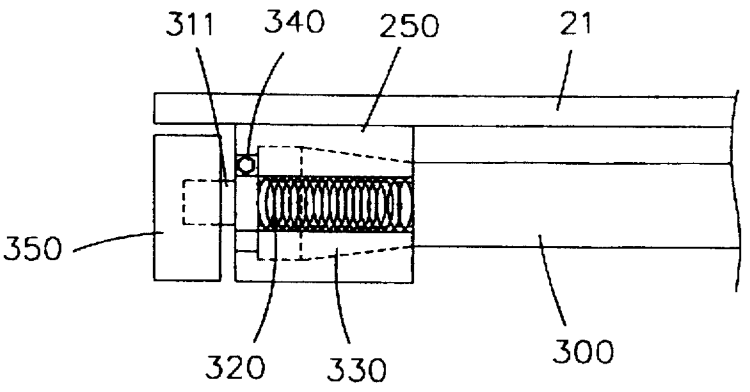
FIG. 5 is a partial cross-sectional view illustrating a step connected with a connecting shaft in a step combining system for an escalator according to the present invention.

As shown in FIGS. 5 and 6, in order that the joints 330 may resist the resilience of the springs 320 and tightly cover the attaching/detaching bars 310, the fixing members 340 fasten together the joints 330 and the connecting shaft 300 using screws 341, when the joints 330 are thrust toward a center of the connecting shaft 300.

As described above, the joints 330 are fixedly combined with the connecting shaft 300 by the fixing members 340. Thus, the attaching/detaching bars 310, formed at each end of the connecting shaft 300, do not slip out of the attaching/detaching groove 251 of the step 21.

Finally, the connecting shaft 300 is inserted into the inserting holes 350*a* of each of the step front rollers 350.

Figure 1:
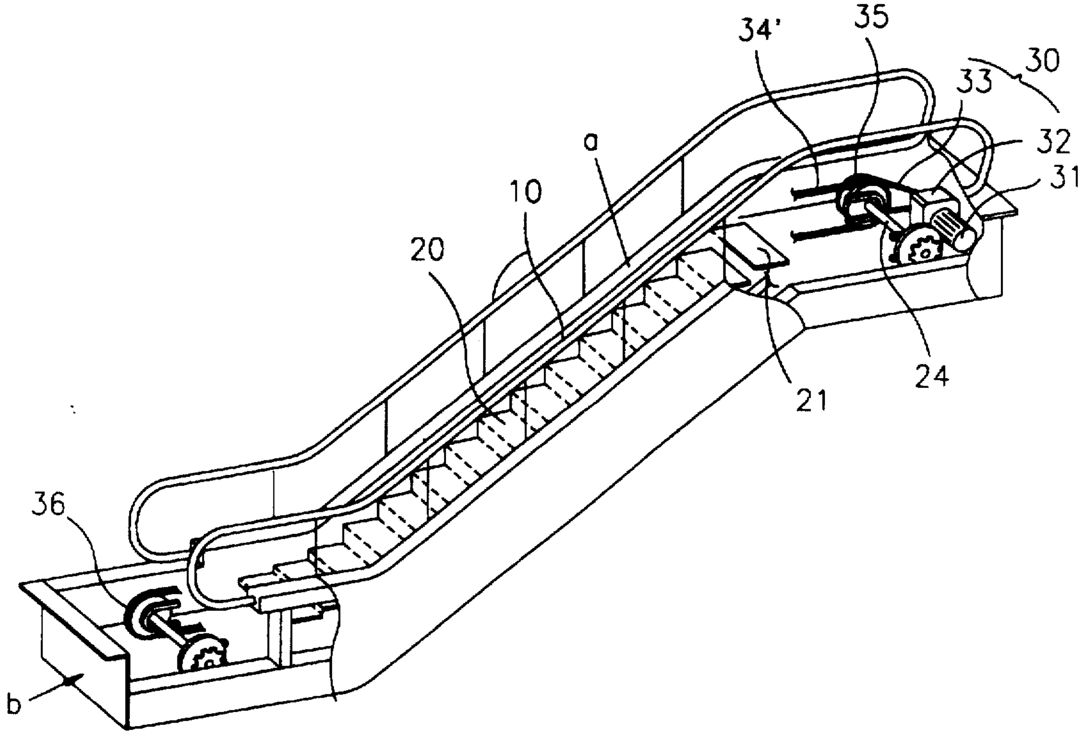
FIG. 1 CONVENTIONAL ART
FIG. 1 is a perspective view illustrating a conventional escalator.
Figure 2:
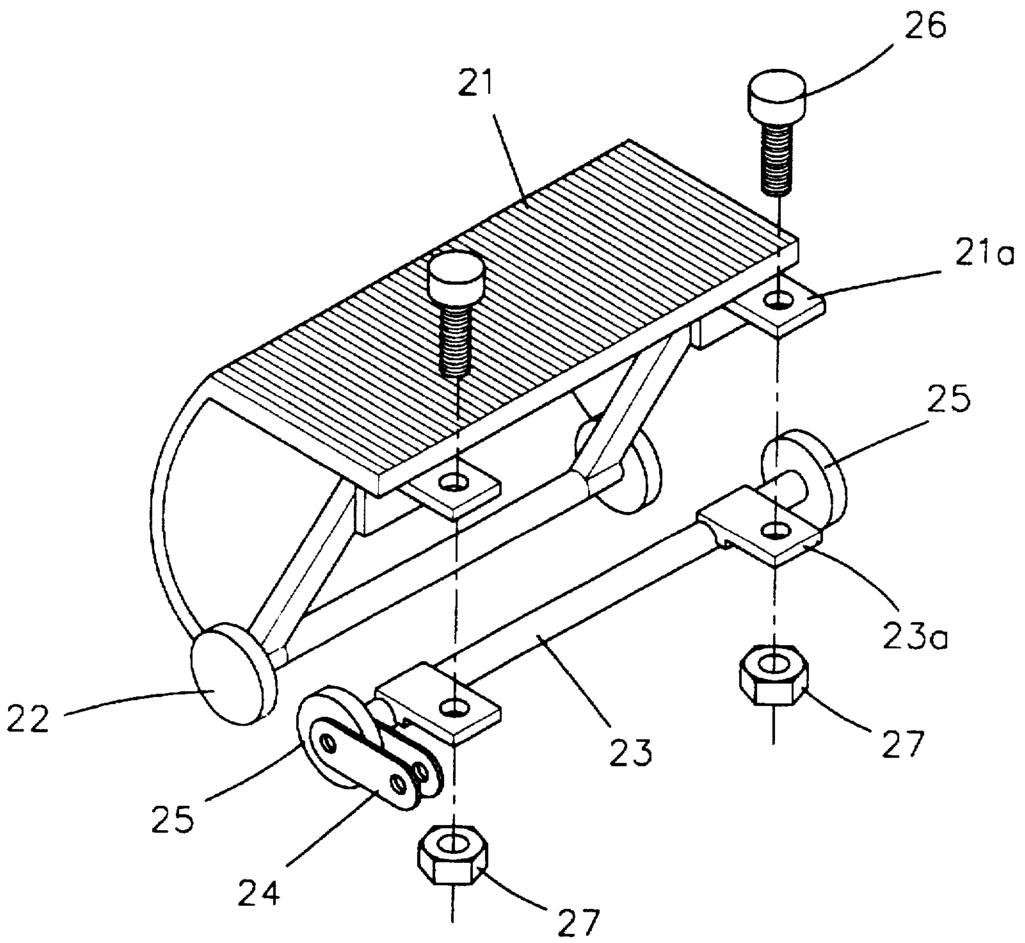
FIG. 2 CONVENTIONAL ART
FIG. 2 is a diagram illustrating a step connected with a step chain according to a step combining system for the conventional escalator.
Figure 3:
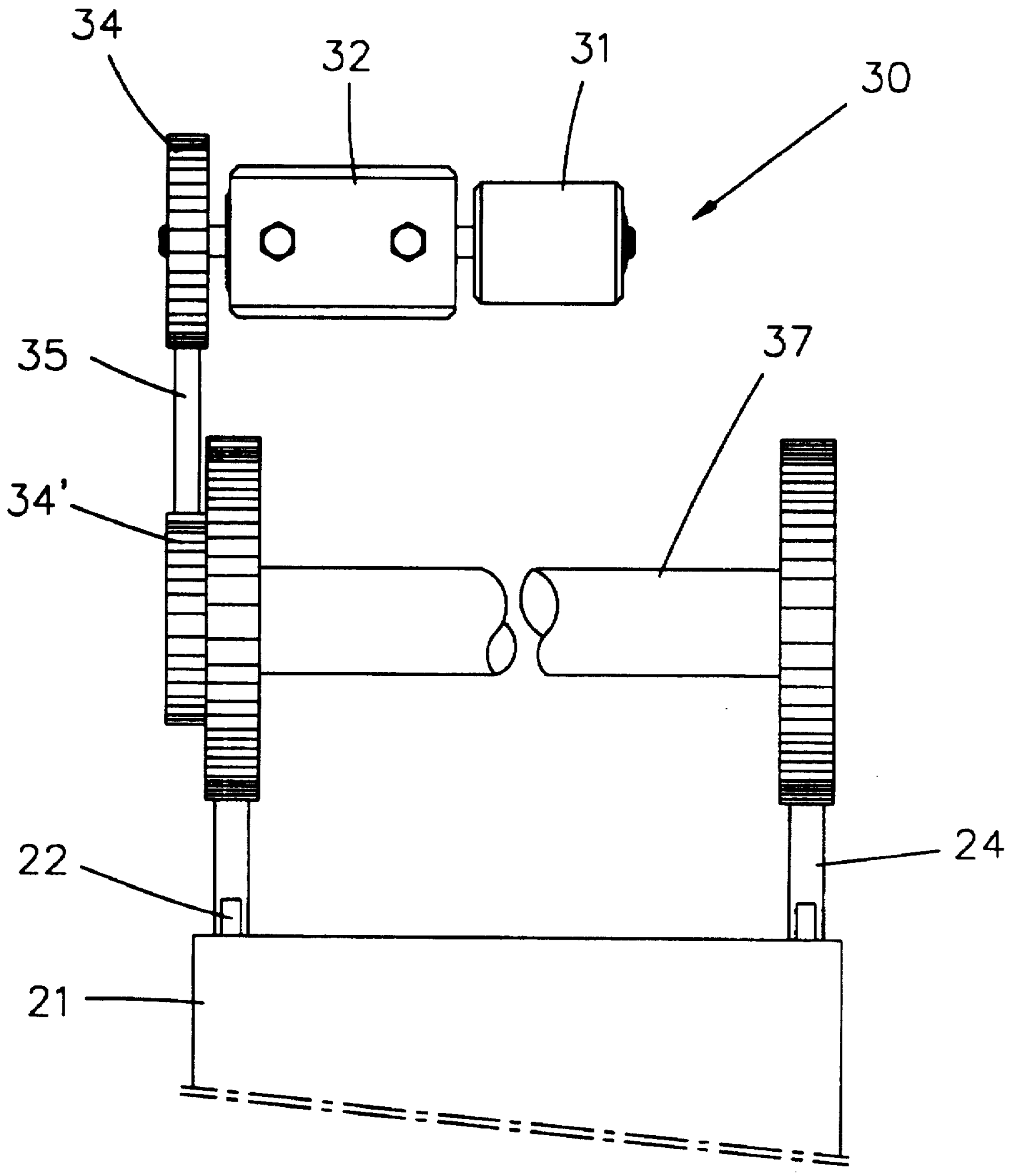
FIG. 3 is a diagram illustrating an upper mechanical unit of the conventional escalator.

Next, when separating step 21 from the connecting shaft 300, the step 21 is moved to a lower space unit (b) as shown in FIG. 1.

The step front rollers 350 are separated from the connecting shaft 300, and the screws 341, which fix the joints 330 to the connecting shaft 300, are loosened.

When the screws 341 are loosened, the joints 330 formed at each end of the connecting shaft 300 are thrust outwardly to the ends of the attaching/detaching bars 310 by the resiliency of the springs 320. Therefore, the attaching/detaching bars 310 are externally exposed.

Next, the attaching/detaching bars 310 are detached from the attaching/detaching grooves 251. Thus, the connecting shaft 300 is separated from the step 21.

Here, since the diameter t2 of the attaching/detaching bars 310 is smaller than the diameter t1 of the entrance of the C-shaped attaching/detaching grooves 251, the attaching/detaching grooves 251 is easily separated therefrom.

As described above, the step separating operation may simply be performed in the lower space unit of the step combining system of the escalator according to the present invention, without moving the step to the side panel of the escalator because the operation for separating the step from the connecting shaft is formed not in the upper space, but in the lower space of the step, thereby reducing operation time and improving operation efficiency.

Although the preferred embodiment of the present invention has been disclosed for illustrative purposes, those skilled in the art will appreciate that various modifications, additions and substitutions are possible, without departing from the scope and spirit of the invention as recited in the accompanying claims.

What is claimed is:

1. A system for linking steps of an escalator, a step in the escalator including an attachment fixture mounted under each end of the step, each attachment fixture including a groove formed on a side thereof, the system comprising:

a connecting shaft including:

attachment/detachment bars extending from opposite ends of said connecting shaft, a width of each attachment/detachment bar being smaller than a width of a respective said groove, whereby each said attachment/detachment bar is readily receivable in and with drawable from a respective said groove, springs attached to each said attachment/detachment bar, joint members each having a through hole formed therethrough shaped to allow a respective said attachment/detachment bar having a respective said spring attached thereto to pass through said through hole, each said joints member being structured so as to prevent a respective said attachment/detachment bar from slipping from a respective said groove.

2. The system according to claim 1, wherein said connecting shaft further includes fixing members for fixing each said joints member relative to a respective said attachment/detachment bar.

3. The system according to claim 1, wherein each said attachment/detachment bar includes a end unit constructed and arranged to have a step front roller mounted thereon.

4. The system according to claim 2, wherein each said attachment/detachment bar includes a end unit constructed and arranged to have a step front roller of the step mounted thereon, wherein each said fixing member is provided on a respective said end unit.

5. The system according to claim 2, wherein each said fixing member fixes a respective said joints member relative a respective said attachment/detachment bar such that said spring associated therewith is resiliently compressed.

* * * * *